US009954335B2

(12) United States Patent
Hasegawa et al.

(10) Patent No.: US 9,954,335 B2
(45) Date of Patent: Apr. 24, 2018

(54) TERMINAL CONNECTION METHOD FOR LITZ WIRE

(71) Applicant: SWCC SHOWA DEVICE TECHNOLOGY CO., LTD., Tokyo (JP)

(72) Inventors: Shirou Hasegawa, Tokyo (JP); Masahiro Mori, Tokyo (JP); Kenji Kamiya, Tokyo (JP); Masahiro Ichikawa, Kanagawa (JP); Kiyoshi Miura, Tokyo (JP); Hiroto Nozaki, Miyagi (JP)

(73) Assignee: SWCC SHOWA CABLE SYSTEMS CO., LTD., Tokyo (JP)

( * ) Notice: Subject to any disclaimer, the term of this patent is extended or adjusted under 35 U.S.C. 154(b) by 300 days.

(21) Appl. No.: 14/422,824

(22) PCT Filed: Aug. 21, 2013

(86) PCT No.: PCT/JP2013/004949

§ 371 (c)(1),
(2) Date: Feb. 20, 2015

(87) PCT Pub. No.: WO2014/030351

PCT Pub. Date: Feb. 27, 2014

(65) Prior Publication Data

US 2015/0229090 A1 Aug. 13, 2015

(30) Foreign Application Priority Data

Aug. 24, 2012 (JP) ................................. 2012-185683

(51) Int. Cl.
*B23K 20/10* (2006.01)
*H01R 43/05* (2006.01)
(Continued)

(52) U.S. Cl.
CPC ............. *H01R 43/05* (2013.01); *H01B 7/306* (2013.01); *H01R 4/187* (2013.01);
(Continued)

(58) Field of Classification Search
CPC .... H01B 7/306; H01R 11/12; H01R 43/0235; H01R 43/0484; H01R 43/05; H01R 4/187
See application file for complete search history.

(56) References Cited

U.S. PATENT DOCUMENTS 5,660,742 A * 8/1997 Warner ................ B23K 11/002 219/243
8,196,299 B2 * 6/2012 Lee ........................ H01R 4/187 29/867
(Continued)

FOREIGN PATENT DOCUMENTS

CN 102037622 A 4/2011
JP 06-275325 A 9/1994
(Continued)

*Primary Examiner* — Minh Trinh
(74) *Attorney, Agent, or Firm* — Brundidge & Stanger, P.C.

(57) ABSTRACT

A terminal connecting method including: removing a insulation film by a predetermined length from one end of a litz wire; inserting to a pressure fixing part a terminal part of the litz wire; compressing a first portion of the pressure fixing part with a first compression force to cause plastic deformation of an entirety of the pressure fixing part, and to temporarily fix the terminal part of the litz wire to the pressure fixing part; compressing a second portion of the pressure fixing part with a second compression force greater than the first compression force to locally cause plastic deformation of the pressure fixing part and the litz wire, the second portion being a part of the first portion; and pouring molten solder from a front end side of the pressure fixing part to firmly fix the litz wire to the terminal metal fitting.

8 Claims, 3 Drawing Sheets

(51) Int. Cl.

| | |
|---|---|
| ***H01R 43/048*** | (2006.01) |
| ***H01B 7/30*** | (2006.01) |
| ***H01R 4/18*** | (2006.01) |
| ***H01R 43/02*** | (2006.01) |
| *H01R 11/12* | (2006.01) |

(52) U.S. Cl.

CPC ..... *H01R 43/0235* (2013.01); *H01R 43/0484* (2013.01); *H01R 11/12* (2013.01)

(56) References Cited

U.S. PATENT DOCUMENTS

| | | | | |
|---|---|---|---|---|
| 9,550,252 | B2 * | 1/2017 | Takayashiki ........... | H01R 4/023 |
| 2004/0088857 | A1 * | 5/2004 | Fujimoto ............... | H01R 11/12<br>29/871 |
| 2010/0144189 | A1 | 6/2010 | Watanabe et al. | |
| 2015/0229090 | A1 * | 8/2015 | Hasagawa .......... | H01R 43/0484<br>174/74 R |

FOREIGN PATENT DOCUMENTS

| | | | |
|---|---|---|---|
| JP | 2008-226671 | A | 9/2008 |
| JP | 2009-295333 | A | 12/2009 |
| JP | 2010-015900 | A | 1/2010 |
| JP | 2010-140651 | A | 6/2010 |
| JP | 2010-225529 | A | 10/2010 |
| WO | 2009/115860 | A1 | 9/2009 |

* cited by examiner

TERMINAL CONNECTION METHOD FOR LITZ WIRE

TECHNICAL FIELD

The present invention relates to a terminal connecting method for a litz wire and to a litz wire provided with a terminal metal fitting. The present invention particularly relates to a technique suitable for a case where a terminal part of a litz wire having a large number of twisted strands is connected to a terminal metal fitting of a closed barrel type.

BACKGROUND ART

In recent years, non-contact power feeding of an electromagnetic induction type using a coil has been studied as a method of charging electric vehicles (EVs). While an enameled wire having a conducting body covered with an insulation film is wound around a coil used in the non-contact power feeding of the electromagnetic induction type, it is necessary to supply a large current having a high frequency in the case of the non-contact power feeding for EVs, and therefore a litz wire having a plurality of enameled wires (strands) twisted together is used. One reason for this is that increase in alternating-current resistance due to the skin effect and the proximity effect specific to high frequency can be limited when a litz wire is used.

To a terminal part of such a litz wire, a terminal metal fitting is connected. Various terminal metal fittings are available, and an example of known terminal metal fittings is a closed-barrel type terminal metal fitting having a cylindrical wire barrel part (hereinafter referred to as "closed barrel terminal"). When connecting a litz wire to the closed barrel terminal, a terminal part of the litz wire is inserted into a wire barrel part, and is firmly fixed thereto.

In the case of a litz wire in which the number of strands twisted together is small, it is possible to adopt fusing (thermal caulking) in which, after a terminal part of the litz wire is inserted to the wire barrel part, electric heating is performed on the terminal metal fitting, to pressure fix the litz wire and the wire barrel part while vaporizing an insulation film. However, since a litz wire (for example, a copper litz wire of about 8 $mm^2$ or an aluminum litz wire of about 13 $mm^2$) which is used for a non-contact power feeding coil for EVs and has a large number of strands twisted together has a large thermal capacity, fusing cannot be applied to such a litz wire. One reason for this is that it is difficult to remove insulation films in the center part of such a litz wire by fusing, and when the heating temperature is increased so as to remove the insulation films in the center part, the conducting body may possibly be melted.

Under such circumstances, conventionally, a method has been applied in which a terminal part of a litz wire is connected to a wire barrel part of a terminal metal fitting by soldering. In such a terminal connection method using soldering, after the insulation film of a terminal part of litz wire 1 is mechanically or chemically removed in advance, litz wire 1 is inserted to wire barrel part 22 of terminal metal fitting 2, and temporarily fixed (retained) by compression, as illustrated in FIG. 1. Then, by pouring solder S having a high temperature from the front end side of wire barrel part 22, litz wire 1 and terminal metal fitting 2 are electrically connected together while melting the remaining insulation films (insulation films in the center part of litz wire 1 in particular).

In addition, the terminal part of litz wire 1 may be preliminarily soldered in order to facilitate the insertion of the terminal part of litz wire 1 to wire barrel part 22.

CITATION LIST

Patent Literature

PTL 1
Japanese Patent Application Laid-Open No. 2008-226671
PTL 2
Japanese Patent Application Laid-Open No. 2009-295333
PTL 3
Japanese Patent Application Laid-Open No. 2010-225529

SUMMARY OF INVENTION

Technical Problem

Incidentally, in the conventional terminal connecting method using soldering, it is necessary to remove the insulation films in the center part of litz wire 1 in the soldering process so as to stabilize the electrical connection property (conductive property) between litz wire 1 and terminal metal fitting 2. However, in this case, litz wire 1 is exposed to solder S having a high temperature for a long period of time, and in addition, by capillarity, solder S deeply infiltrates into litz wire 1 in the longitudinal direction. As a result, the insulation film is welded and cured by an excessive length, and thus the flexibility around the terminal metal fitting is lost (see FIG. 1).

Such a litz wire provided with a terminal metal fitting easily causes fatigue rupture around terminal metal fitting 2 (the rear end side of wire barrel part 21), and therefore cannot meet the demand of vibration proofness of the electric automobile industry and the like.

In addition, if excessive soldering is performed to improve the electrical connection property, solder S is formed on the front end side of wire barrel part 21 in a bulging form, and the external appearance is degraded, which is not preferable as a product.

It is to be noted that, for example, PTLs 1 to 3 disclose techniques relating to electric wire terminal connecting methods. PTL 1 discloses a terminal pressure fixation structure for extra fine wires which can ensure both an electric connection property and an electric wire-retaining property by performing pressure fixing with compression ratios different between the front and rear portions of a wire barrel part. PTL 2 discloses a technique of pressure fixing with compression ratios different among plural positions when a plurality of electric wires are connected using a splice terminal. PTL 3 discloses a technique suitable for connecting a terminal metal fitting to an aluminum stranded wire in which a plurality of strands (for example aluminum strands) are twisted together.

However, the techniques disclosed in PTLs 1 to 3 are not designed for litz wires, and as a matter of course, cannot solve the above-mentioned problems that are caused at the time of connecting a terminal metal fitting to a litz wire in which a large number of strands are twisted.

An object of the present invention is to provide a terminal connecting method for a litz wire and a litz wire provided with a terminal metal fitting which can improve the connection reliability (electrical connection property, electric wire-retaining property, vibration proofness the like)

between the litz wire and the terminal metal fitting, and can prevent degradation of the external appearance of the terminal connecting part.

Solution to Problem

A terminal connecting method for a litz wire according to an embodiment of the present invention is intended for electrically connecting a terminal metal fitting to a litz wire, the terminal metal fitting having a pressure fixing part having a cylindrical shape, the litz wire being obtained by twisting together a plurality of strands each composed of a conducting body and an insulation film provided on an outer peripheral surface of the conducting body, the method including: removing the insulation film by a predetermined length from one end of the litz wire; inserting to the pressure fixing part a terminal part of the litz wire from which the insulation film is removed; compressing a first portion of the pressure fixing part with a first compression force to cause plastic deformation of an entirety of the pressure fixing part, and to temporarily fix the terminal part of the litz wire to the pressure fixing part; compressing a second portion of the pressure fixing part with a second compression force greater than the first compression force to locally cause plastic deformation of the pressure fixing part and the litz wire, the second portion being a part of the first portion; and pouring molten solder from a front end side of the pressure fixing part to firmly fix the litz wire to the terminal metal fitting.

In a litz wire provided with a terminal metal fitting according to an embodiment of the present invention, the terminal metal fitting is connected to the terminal part of the litz wire by the above-mentioned method.

Advantageous Effects of Invention

With the above-mentioned litz wire terminal connecting method, after the litz wire is temporarily fixed to the terminal metal fitting, the litz wire is further compressed, and thus the strands are closely joined together while partially eliminating the gaps therebetween. In this manner, solder poured from the front end side of the terminal metal fitting can be effectively prevented from intruding to the rear end side by capillarity.

Accordingly, the connection reliability (electrical connection property, electric wire-retaining property, vibration proofness and the like) between the litz wire and the terminal metal fitting can be improved, and degradation of the external appearance of the terminal connecting part can be prevented.

DESCRIPTION OF EMBODIMENT

In the following, an embodiment of the present invention is described in detail with reference to the drawings.

Figure 1:
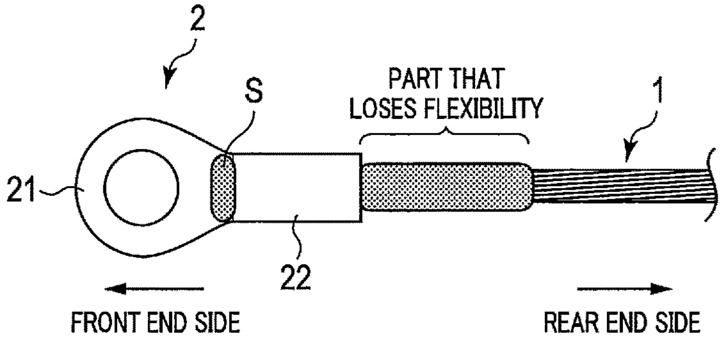
FIG. 1 is a plan view illustrating a litz wire provided with a terminal metal fitting which is manufactured by a conventional terminal connecting method using soldering.
Figure 2:
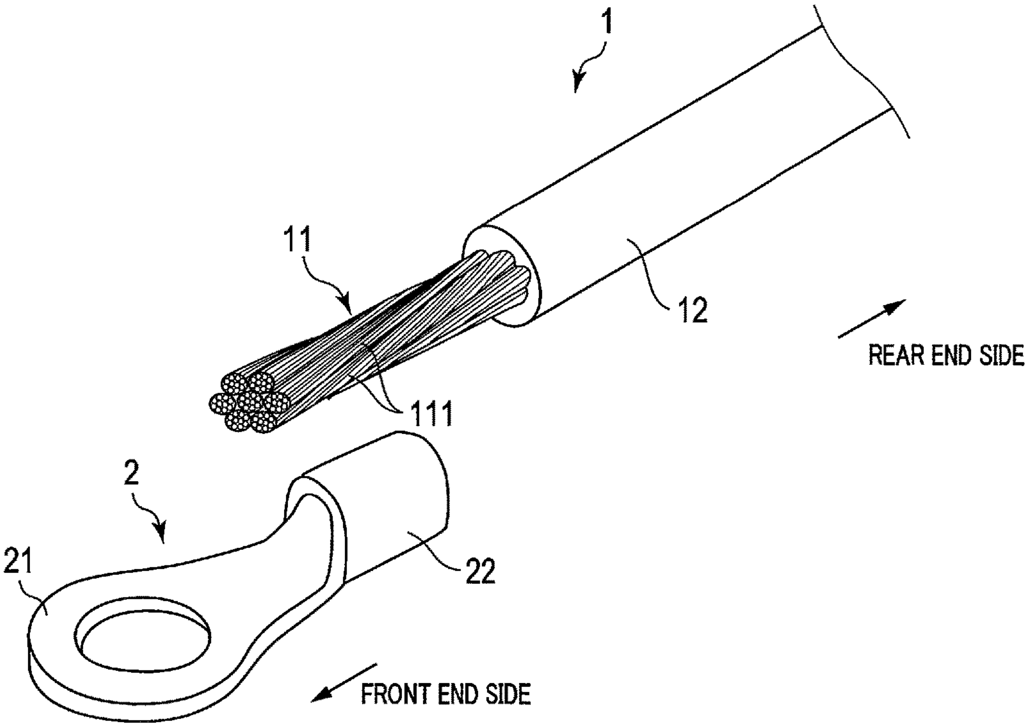
FIG. 2 is a perspective view illustrating a litz wire and a terminal metal fitting which are used in an embodiment.

FIG. 2 is a perspective view illustrating a litz wire and a terminal metal fitting which are used in the embodiment. As illustrated in FIG. 2, litz wire 1 has a configuration in which exterior cover 12 is provided on the outer peripheral surface of collective conductor 11 obtained by twisting a plurality of strands 111 together. In the following description, the side on which terminal metal fitting 2 is connected is referred to "front end side," and the side opposite to the front side is referred to as "rear end side."

Strand 111 is, for example, an enameled wire obtained by baking an insulation film made of poly urethane on a conducting body made of copper or copper alloy. The conducting body of strand 111 may be aluminum, aluminum alloy, a clad metal of copper and aluminum, or the like. In addition, the insulation film of strand 111 may be made of a resin material which is melted by solder having a high temperature at the time when litz wire 1 is connected to terminal metal fitting 2 by soldering. Examples of such a resin material include polyvinylformal, polyurethane nylon, polyester, polyester nylon, polyesterimide, polyamideimide, polyesterimide/polyamide imide, polyimide, and the like, in addition to poly urethane.

Collective conductor 11 is obtained by twisting a plurality of strands 111 together. Although FIG. 2 illustrates a simplified configuration, collective conductor 11 is obtained by twisting together 1,200 strands 111 each having a diameter of 0.14 mm, for example. It is to be noted that collective conductor 11 may be a composite stranded wire which is obtained by twisting together primary assembled wires, which are each obtained by twisting together a plurality of strands 111.

Exterior cover 12 is composed of polyvinyl chloride or crosslinked polyethylene for example, and is so formed as to have a predetermined outer diameter. Instead of exterior cover 12, silk or polyester fiber (Tetron (registered trademark)) may be laterally wound around collective conductor 11.

It is to be noted that the diameter of strand 111, the number of twisted strands, the thickness of exterior cover 12, the materials, and the like are not limited to those described herein, and may be appropriately selected. It should be noted that the terminal connecting method for a litz wire described in the present embodiment is suitable for a case where the diameter of litz wire 1 is 0.05 to 0.30 mm, and the number of the twisted strands is 50 to 3000, that is, a case where strands 111 are each composed of an extra fine wire, and the number of the twisted strands is significantly large.

Terminal metal fitting 2 is composed of copper or copper alloy, and a tin plating treatment is performed on terminal metal fitting 2 to prevent surface oxidation. Terminal metal fitting 2 is a so-called closed-barrel type round pressure fixing terminal, which includes ring-shaped connecting part 21 at which a power feeding terminal of an electronic apparatus or the like is connected, and cylindrical wire barrel part 22 provided continuously with connecting part 21. By fastening connecting part 21 to the apparatus with a bolt, litz wire 1 and the electronic apparatus are electrically connected together through terminal metal fitting 2.

Wire barrel part 22 is formed in a cylindrical shape having an internal diameter of 5 to 12 mm, an outer diameter of 7 to 14 mm, and a length of 5 to 10 mm, for example. By pressure fixing and soldering, wire barrel part 22 grabs collective conductor 11 of the terminal part of litz wire 1 so as to wrap collective conductor 11 of the terminal part of litz wire 1. In addition, in order to prevent strand 111 from being damaged by the edge pressed into strand 111 at the time of compression, the rear edge of wire barrel part 22 is rounded.

It is to be noted that the size of terminal metal fitting 2 is appropriately selected in accordance with the size of litz wire 1 to be connected thereto.

FIGS. 3A to 3E illustrate the terminal connecting method for a litz wire according to the embodiment.

Figure 3A:
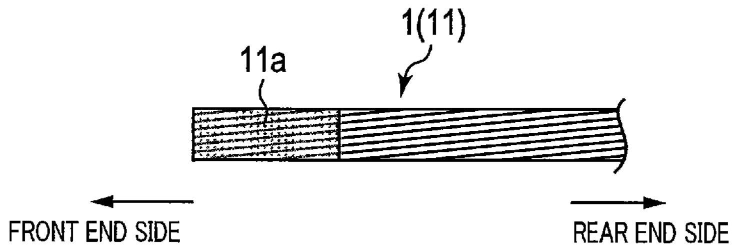
FIGS. 3A to 3E are a flow chart illustrating a terminal connecting method for a litz wire according to the embodiment.

In the first step, as illustrated in FIG. 3A, exterior cover 12 on the end part of litz wire 1 is peeled off so as to expose collective conductor 11 by a predetermined length. Then, the insulation film is removed by a predetermined length from one end (front end side) of litz wire 1. The length of the insulation film to be removed is adjusted such that the length is substantially the same as the length of wire barrel part 22 of terminal metal fitting 2.

The insulation film of strand 111 may be removed by a mechanical stripping method using a wire brush or the like, or a chemical peeling method of immersion in solvent or the like. In addition, in the first step, it is not necessary to remove all the insulation film to be removed as long as the insulation film to be removed is removed to a certain degree. One reason for this is that the insulation film remained after the first step is melted and removed by the soldering in the fifth step.

Figure 3B:
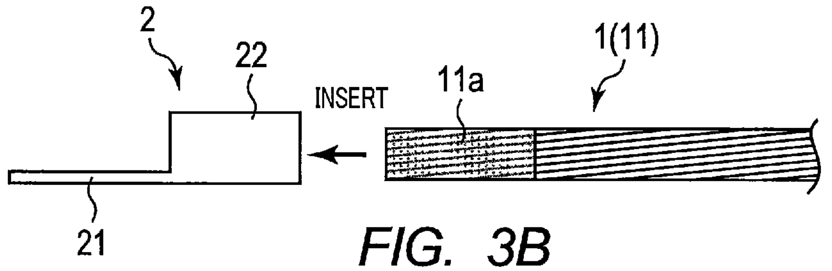

In the second step, as illustrated in FIG. 3B, the terminal part 11*a* of litz wire 1 from which the insulation film has been removed is inserted into wire barrel part 22 of terminal metal fitting 2. At this time, it is also possible to preliminarily solder the front end of terminal part 11*a* of litz wire 1 in order to facilitate the insertion of litz wire 1 into wire barrel part 22.

Figure 3C:
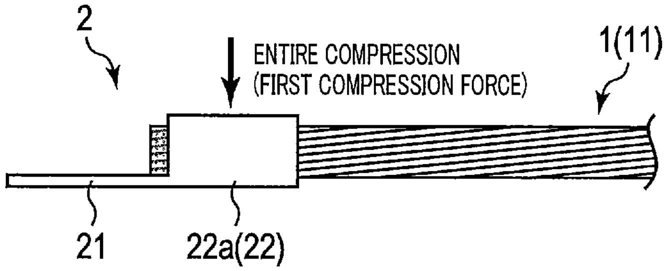

In the third step, as illustrated in FIG. 3C, first portion 22*a* of wire barrel part 22 is compressed with a first compression force, and terminal part 11*a* of litz wire 1 is temporarily fixed to wire barrel part 22. To be more specific, a pressure fixing apparatus is used to sandwich and press wire barrel part 22 from the upper and lower sides, to thereby cause plastic deformation of wire barrel part 22. Through the third step, it is possible to ensure a suitable electric wire-retaining property, and to reduce deformation and strain at the time when strong compression is locally performed in the fourth step described later.

Here, the first portion is the entirety of wire barrel part 22 for example. In this case, the outer diameter of wire barrel part 22 corresponds to the length in the width direction (the direction orthogonal to the longitudinal direction of litz wire 1) of first portion 22*a* before the compression. First portion 22*a* may be a region slightly smaller than wire barrel part 22.

In addition, the first compression force is a compression force with which plastic deformation of wire barrel part 22 is mainly caused such that wire barrel part 22 and litz wire 1 (collective conductor 11) make close contact with each other, and the gaps among strands 111 are almost eliminated. That is, the first compression force is a compression force with which excessive plastic deformation of strand 111 is not caused, and with which litz wire 1 cannot be pulled out from terminal metal fitting 2.

To be more specific, the first compression force is preferably 100 MPa to 1,000 MPa, both inclusive. Here, the first compression force is expressed by a value obtained by dividing the load exerted on first portion 22*a* by the area (=length×outer diameter) of first portion 22*a* in plan view. Likewise, the second compression force described later is expressed by a value obtained by dividing the load exerted on second portion 22*b* by the area of second portion 22*b* in plan view. For example, in the case where the entirety of wire barrel part 22 is first portion 22*a*, and wire barrel part 22 has a length of 10 mm and an outer diameter of 6 mm (area in plan view: 60 $mm^2$), a load of 6 kN to 60 kN, both inclusive, is exerted on first portion 22*a*.

By setting the first compression force to 100 MPa or greater, litz wire 1 can be suitably held. In addition, by setting the first compression force to 1,000 MPa or smaller, it is possible to prevent a situation where plastic deformation of the entire strand 111 is caused and consequently the strength of litz wire 1 at the terminal connecting part is significantly reduced.

Figure 3D:
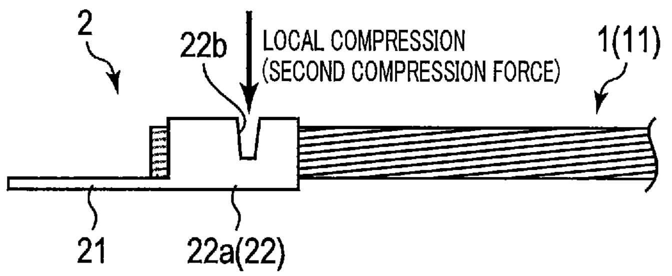

In the fourth step, as illustrated in FIG. 3D, second portion 22*b* of wire barrel part 22 is compressed with a second compression force, and local plastic deformation of wire barrel part 22 and litz wire 1 (collective conductor 11) is caused.

Here, second portion 22*b* is a portion smaller than first portion 22*a* compressed in the third step, and has, for example, a rectangular shape in plan view. Preferably, the length of second portion 22*b* in the width direction is greater than 60% of the length (outer diameter of wire barrel part 22) of first portion 22*a* in the width direction before the compression. With such a configuration, strands 111 are closely joined together over the width direction, and thus infiltration of solder S to the rear end side caused by capillarity can be effectively blocked.

In addition, the second compression force is a compression force with which plastic deformation of wire barrel part 22 and litz wire 1 (each strand 111) is caused, and with which the gaps among strands 111 are partially completely eliminated.

To be more specific, preferably, the second compression force is 1,000 MPa to 10,000 MPa, both inclusive. By setting the second compression force to 1000 MPa or greater, strands 111 can be closely joined together over the width direction. In addition, by setting the second compression force to 10,000 MPa or smaller, strand 111 can be prevented from being ruptured.

Figure 4:
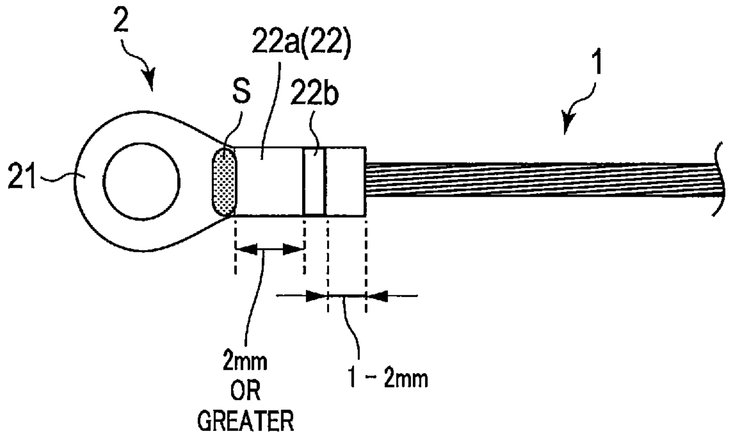
FIG. 4 is a plan view illustrating a litz wire provided with a terminal metal fitting manufactured by the terminal connecting method for a litz wire according to the embodiment.

Preferably, the rear edge of second portion 22*b* is located 1 to 2 mm inside from the rear end of wire barrel part 22 (see FIG. 4). One reason for this is that, if the rear edge of second portion 22*b* is too close to the rear end of wire barrel part 22, strand 111 may possibly be damaged at the rear edge of wire barrel part 22 at the time of compression.

Furthermore, preferably, the front edge of second portion 22*b* is located at least 2 mm or more inside from the front end of wire barrel part 22, and more preferably, is located on the rear end side relative to the center portion (see FIG. 4). One reason for this is that, if the front edge of second portion 22*b* is too close to the front end of wire barrel part 22, solder S cannot be provided in the gaps among strands 111, and consequently a favorable electrical connection property may possibly be impaired.

Figure 3E:
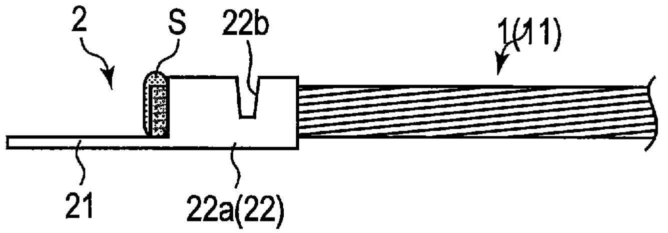

In the fifth step, as illustrated in FIG. 3E, molten solder S having a high temperature (for example 200° C.) is poured from the front end side of wire barrel part 22 to firmly fix (solder) litz wire 1 to terminal metal fitting 2. Since the remaining insulation film is melted and removed by solder S having a high temperature, all strands 111 are surely electrically connected with terminal metal fitting 2. In this manner, a litz wire provided with a terminal is produced (see FIG. 4).

In the fifth step, poured solder S tends to infiltrate into the gaps among strands 111 by capillarity, but is blocked by locally compressed second portion 22*b*. Thus, the remaining insulation film can be efficiently melted and removed in a short time, and litz wire 1 can be soldered to terminal metal fitting 2.

Since litz wire 1 and terminal metal fitting 2 can be electrically connected with the minimum amount of solder S, it is possible shorten the heating time, and to prevent solder S from being bulged at the terminal connecting part, thus preventing degradation of the external appearance. In addition, since the insulation film is not excessively melted, the flexibility at and around terminal metal fitting 2 is not lost, and desired vibration proofness can be achieved.

As described, a terminal connecting method for a litz wire according to the embodiment includes: a first step of removing the insulation film by a predetermined length from one end of litz wire 1; a second step of inserting to wire barrel part 22 (pressure fixing part) terminal part 11*a* of litz wire 1 from which the insulation film is removed; a third step of compressing first portion 22*a* of wire barrel part 22 with a first compression force to cause plastic deformation of an entirety of wire barrel part 22, and to temporarily fix terminal part 11*a* of litz wire 1 to wire barrel part 22; a fourth step of compressing second portion 22*b* of wire barrel part 22 with a second compression force greater than the first compression force to locally cause plastic deformation of wire barrel part 22 and litz wire 1, second portion 22*b* being a part of first portion 22*a*; and a fifth step of pouring molten solder S from a front end side of wire barrel part 22 to firmly fix litz wire 1 to terminal metal fitting 2.

With the above-mentioned terminal connecting method for a litz wire, after litz wire 1 is temporarily fixed to terminal metal fitting 2 in the third step, litz wire 1 is further compressed in the fourth step, and thus strands 111 are closely joined together while partially eliminating the gaps therebetween. In this manner, solder S poured from the front end side of terminal metal fitting 2 in the fifth step can be effectively prevented from intruding to the rear end side by capillarity.

Accordingly, it is possible to manufacture a litz wire provided with a terminal which ensures favorable connection reliability (electrical connection property, electric wire-retaining property, vibration proofness and the like), and raises no external-appearance problem.

EXAMPLE

In the example, as terminal metal fitting 2, a commonly-used round pressure fixing terminal of 22-6R was connected to litz wire 1 obtained by twisting 200 urethane insulation copper wires (UEW) each having a diameter of 0.2 mm.

In the third step, the entirety (first portion 22*a*) of wire barrel part 22 was compressed by 500 MPa (first compression force).

In the fourth step, the center portion (second portion 22*b*) of wire barrel part 22 was compressed by 5,000 MPa (second compression force).

In the fifth step, solder having a temperature of 220° C. was poured from the front end side of wire barrel part 22 for 5 minutes, and litz wire 1 and terminal metal fitting 2 were connected together with solder.

In the litz wire provided with a terminal metal fitting obtained in the above-mentioned manner, no welding or curing of litz wire 1 at and around the rear end of terminal metal fitting 2 was observed. Accordingly, it can be said that the litz wire provided with a terminal metal fitting obtained in the above-mentioned manner has a structure which does not easily cause fatigue rupture in comparison with a litz wire provided with a terminal metal fitting obtained by the conventional terminal connecting method using soldering, and the litz wire obtained in the above-mentioned manner is expected to meet the demand of vibration proofness of the electric-automobile industry and the like. In addition, bolt fastening to an electronic apparatus and laying of litz wire 1 are advantageously facilitated.

While the invention made by the present inventor has been specifically described based on the preferred embodiments, it is not intended to limit the present invention to the above-mentioned preferred embodiments but the present invention may be further modified within the scope and spirit of the invention defined by the appended claims.

Figure 5:
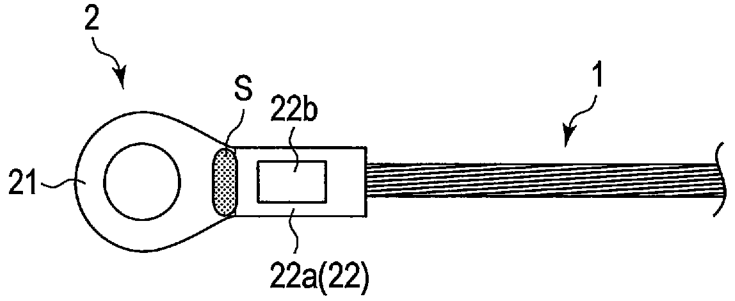
FIG. 5 is a plan view illustrating a litz wire provided with a terminal metal fitting according to a modification.

For example, the shape of second portion 22*b* of wire barrel part 22 compressed in the fourth step is not limited to the belt-shape extending in the width direction illustrated in FIG. 4, and may be a rectangular shape or a circular shape (including an ellipse and an oval) which can be contained in first portion 22*a* of wire barrel part 22 as illustrated in FIG. 5.

In addition, for example, the third step and fourth step may be simultaneously performed by using a compressor having a pressing surface (the surface making contact with wire barrel part 22) formed in a protruding shape.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This disclosure of Japanese Patent Application No. 2012-185683, filed on Aug. 24, 2012, including the specification, drawings and abstract, is incorporated herein by reference in its entirety.

REFERENCE SIGNS LIST

1 Litz wire
11 Collective conductor
111 Strand
12 Exterior cover
2 Terminal metal fitting
21 Connecting part
22 Wire barrel part
22*a* First portion
22*b* Second portion

The invention claimed is:

1. A terminal connecting method for a litz wire for electrically connecting a terminal metal fitting to the litz wire comprising:

providing the terminal metal fitting and the litz wire, the terminal metal fitting having a pressure fixing part having a cylindrical shape, the litz wire being obtained by twisting together a plurality of strands each composed of a conducting body and an insulation coating provided on an outer peripheral surface of the conducting body;

removing the insulation coating by a predetermined length from one end of the litz wire;

inserting along the axial direction to a through hole of the pressure fixing part a terminal part of the litz wire from which the insulation coating is removed;

compressing a first portion of the pressure fixing part with a first compression force to cause plastic deformation of an entirety of the pressure fixing part, and to temporarily fix the terminal part of the litz wire to the pressure fixing part;

compressing a second portion of the pressure fixing part with a second compression force greater than the first compression force to locally cause plastic deformation of the pressure fixing part and the litz wire, the second portion being a part of the first portion; and pouring molten solder from a front end side of the pressure fixing part to firmly fix the litz wire to the terminal metal fitting.

2. The terminal connecting method for a litz wire according to claim 1, wherein the first compression force is 100 MPa to 1,000 MPa, both inclusive; and wherein the second compression force is 1,000 MPa to 10,000 MPa, both inclusive.

3. The terminal connecting method for a litz wire according to claim 2, wherein a length of the second portion in a width direction is 60% or greater of a length of the first portion in a width direction before the first portion is compressed.

4. The terminal connecting method for a litz wire according to claim 1, wherein a rear edge of the second portion is located 1 to 2 mm inside from a rear end of the pressure fixing part.

5. The terminal connecting method for a litz wire according to claim 1, wherein a front edge of the second portion is located 2 mm or more inside from a front end of the pressure fixing part.

6. The terminal connecting method for a litz wire according to claim 1, wherein:

each strand of the litz wire has a diameter of 0.05 mm to 0.30 mm, both inclusive; and a number of strands twisted together of the litz wire is 50 to 3,000, both inclusive.

7. The terminal connecting method for a litz wire according to claim 1, wherein the insulation coating is made of a resin material which is removable in the pouring.

8. The terminal connecting method for a litz wire according to claim 1, wherein a length of the second portion in a width direction is 60% or greater of a length of the first portion in a width direction before the first portion is compressed.

* * * * *